J. C. Center. Harrow.
117258
PATENTED JUL 25 1871
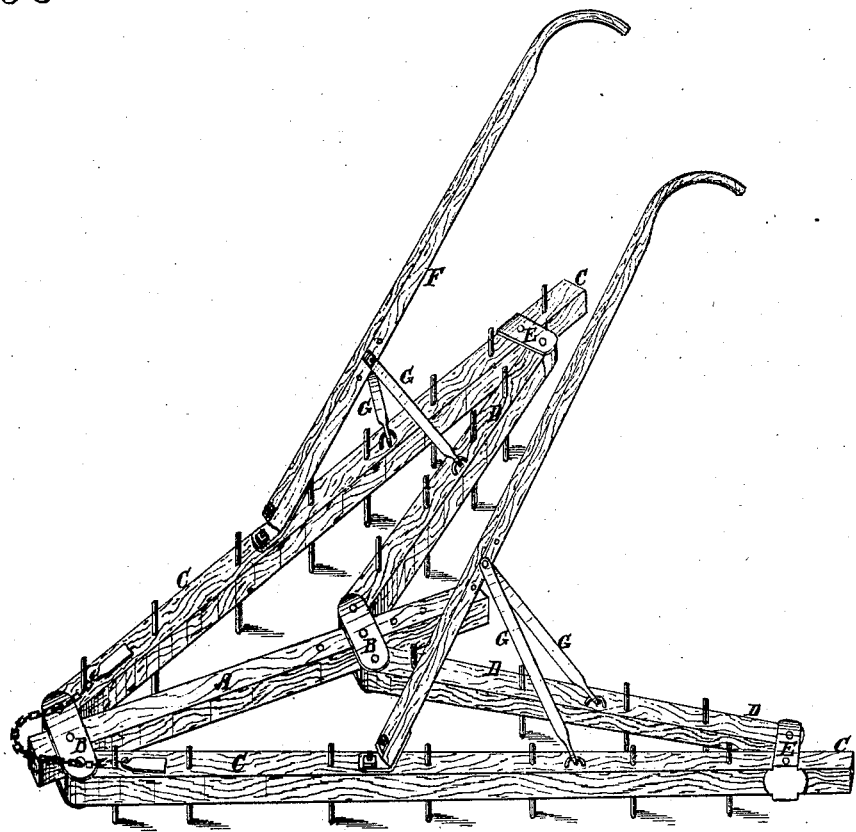

UNITED STATES PATENT OFFICE.

JOSHUA C. CENTER, OF MASON CITY, ILLINOIS.

IMPROVEMENT IN HARROWS.

Specification forming part of Letters Patent No. 117,258, dated July 25, 1871.

*To all whom it may concern:*

Be it known that I, JOSHUA C. CENTER, of Mason City, in the county of Mason and State of Illinois, have invented a new and useful Improvement in Harrows; and I do hereby declare that the following is a full, clear, and exact description thereof, which will enable others skilled in the art to make and use the same, reference being had to the accompanying drawing forming part of this specification, in which the figure is a perspective view of my improved harrow.

My invention has for its object to improve the construction of my improved harrow, patented April 28, 1868, and numbered 77,354, so as to make it more perfect in construction and more convenient in use; and it consists in the combination of a pair of handles and their supporting-braces with the bars of the harrow, as hereinafter more fully described.

A is the central or draft-beam, which may be single or double, and to which are connected, by hinges B, the inner ends of the side bars or beams C D, the outer ends of each pair of which are connected by the hinges E, as fully described in patent 77,354. F are the handles, two of which are used, one upon each side of the harrow, and which are entirely independent of each other. The forward end of each of the handles F is connected with and pivoted to the forward outer and longer beams or bars C. The rear parts of each of the handles F are supported by two brace-bars, G, the upper ends of which are connected with the opposite sides of the handle F by a bolt, which passes through the ends of the said braces G and through one or the other of the holes formed for it in the said handle F. The lower end of the outer brace G is pivoted to the outer bar or beam C by a staple, eyebolt, or similar means, and the lower end of the inner brace G is pivoted to the inner beam D in the same way. This construction enables the handles to be securely held, whether the harrow be extended or contracted. The rear ends of the handles F project into such a position that the driver, while walking in the angular space between the rear ends of the side bars or beams C D, can conveniently reach them when required in controlling and handling the harrow.

Having thus described my invention, I claim as new and desire to secure by Letters Patent—

The combination of the handles F and braces G with the side bars C D of my improved harrow, substantially as herein shown and described, and for the purpose set forth.

JOSHUA C. CENTER.

Witnesses:
A. F. KEES,
THOS. B. CRAWFORD.